United States Patent [19]

Suzuki et al.

[11] Patent Number: 5,294,469
[45] Date of Patent: Mar. 15, 1994

[54] INDUSTRIAL WOVEN FABRIC AND COMPOSITE SHEET COMPRISING SAME

[75] Inventors: Kazuhika Suzuki; Takayuki Watanabe; Yasuhiro Kitahara; Masanobu Ajioka, all of Kanagawa, Japan

[73] Assignee: Mitsui Toatsu Chemicals, Incorporated, Tokyo, Japan

[21] Appl. No.: 77,679

[22] Filed: Jun. 16, 1993

[30] Foreign Application Priority Data

Jun. 17, 1992 [JP] Japan .................................. 4-158000
Jun. 17, 1992 [JP] Japan .................................. 4-158001
Jun. 17, 1992 [JP] Japan .................................. 4-158002
Jun. 17, 1992 [JP] Japan .................................. 4-158006

[51] Int. Cl.$^5$ .......................... B32B 1/02; B32B 1/08; B32B 1/10; B32B 27/02; B32B 33/00
[52] U.S. Cl. .................................. 428/36.1; 139/420 R; 156/176; 220/DIG. 30; 427/209; 428/36.2; 428/36.91; 428/252; 428/272; 428/913
[58] Field of Search ............... 139/420 R; 156/176; 220/DIG. 30; 428/35.2, 36.1, 36.2, 36.91, 252, 272, 913; 427/209

[56] References Cited

U.S. PATENT DOCUMENTS

1,995,970  3/1935  Dorough .
2,362,511  11/1944  Teeters .
2,683,136  7/1954  Higgins .
3,225,766  12/1965  Baptis .
3,636,956  1/1972  Schneider .
3,797,499  3/1974  Schneider .
4,118,470  10/1978  Casey .
4,669,474  6/1987  Barrows .

FOREIGN PATENT DOCUMENTS

122459  5/1988  Japan .

*Primary Examiner*—James C. Cannon
*Attorney, Agent, or Firm*—Burns, Doane, Swecker & Mathis

[57] ABSTRACT

A thermoplastic polymer composition primarily comprising polylactic acid or a copolymer of lactic acids and the other hydroxycarboxylic acids than lactic acids, industrial fabrics which can be degraded into nontoxic water and carbon dioxide within a relatively short period under the natural environment, and flexible containers, water shielding sheets and resin coated-cloth ventilation tubes which are prepared from the industrial fabrics.

8 Claims, No Drawings

INDUSTRIAL WOVEN FABRIC AND COMPOSITE SHEET COMPRISING SAME

BACKGROUND OF THE INVENTION AND RELATED ART

1. Field of the Invention

The present invention relates to a woven fabric for industrial materials which is prepared from a thermoplastic polymer composition primarily comprising polylactic acid or a copolymer of lactic acids and the other hydroxycarboxylic acids than lactic acids (generic name of the polylactic acid and the copolymer will hereinafter be referred to simply as a lactic acid base polymer) and can be degraded under natural environment, and a composite sheet fabricated from said woven fabric. Further, the invention relates to flexible containers, water shielding sheets and resin coated-cloth tubes for ventilation (or resin coated-cloth ventilation tubes) which can be obtained using the composite sheet.

2. Related Art of the Invention

Woven fabrics of synthetic resin filaments which have been developed for industrial uses are plain weave fabrics, twill weave fabrics and satin weave fabrics of nylon, polyester, polypropylene and polyethylene. These synthetic resin fabrics are excellent in mechanical strengths and thus widely used for mesh sheets in a site of building and construction. Further, composite sheets prepared from these fabrics are used for flexible containers, water shielding sheets and resin coated-cloth ventilation tubes in a construction site. These industrial materials are excellent in folding ability, air leakage resistance, waterproofness, welding ability, weatherability and flexibility, and are hence useful for a site of building, construction and mining.

Although woven fabrics made of the above synthetic resins and a composite sheet fabricated from the woven fabric have some excellent properties, refuse disposal of them causes environmental problems. Because these materials are made of synthetic resins which are not degraded almost under the natural environment, they have a very slow rate of degradation and thus remain semipermanently when discarded as refuse and buried under the ground. Disposal of these plastics in the ocean causes damage of a view or destruction of the living environment of marine organisms.

On the other hand, polylactic acids and a copolymer of lactic acid and the other hydroxycarboxylic acids than lactic acids have been developed as thermoplastic polymers having degradability. These polymers can be completely biodegraded within a few months to an year in an animal body. When the polymers are placed in soil or sea water, they start to decompose within a few weeks in a moist environment and disappear within several years. Further, final degradation products of these polymers are lactic acid, carbon dioxide and water which are nontoxic to human body.

Polymers of lactic acid are usually prepared from a cyclic dimer of lactic acid which is called lactide, and U.S. Pat. Nos. 1,995,970, 2,362,511, and 2,683,136 have disclosed a polymerization process of lactide. U.S. Pat. Nos. 3,636,956 and 3,797,499 have disclosed a process for copolymerizing lactic acid and glycolic acid. In the copolymerization of lactic acid and other hydroxy carboxylic acid copolymer, lactide and a cyclic ester intermediate, for example glycolide, i.e., a dimer of glycolic acid, are used for polymerization.

Although the above degradable polymers are widely used for medical materials, for example, suture, absorbent cotton and so on, woven fabric of the above degradable resins and a composite sheet fabricated from the woven fabric have been unknown for use of many industrial materials.

SUMMARY OF THE INVENTION

The object of the invention is to provide a fabric which can be degraded under natural environment and is useful for an industrial material, a composite sheet fabricated from the fabric, and further provide a flexible container, water shielding sheet and resin coated-cloth ventilation tube by using the composite sheet.

In order to obtain a fabric which can be degraded under natural environment and is useful for an industrial material and to fabricate a composite sheet from the fabric, the present inventors have focused attention on the above lactic acid base polymer, investigated a fabric consisting of a composition primarily comprising the lactic acid base polymer and a composite sheet fabricated from the fabric and thus completed the invention.

That is, the aspect of the invention is an industrial fabric prepared from a thermoplastic polymer composition primarily comprising polylactic acid or a copolymer of lactic acids and the other hydroxycarboxylic acids than lactic acids; a composite sheet obtained by laminating on one or both sides of the industrial fabric a film prepared from the thermoplastic polymer composition primarily comprising polylactic acid or a copolymer of lactic acids and the other hydroxycarboxylic acids than lactic acids, or by impregnating the industrial fabric with the thermoplastic polymer composition; and a degradable flexible container, degradable water shielding sheet and degradable resin coated-cloth ventilation tube which are fabricated from said composite sheet.

The industrial fabric primarily comprising the lactic acid base polymer of the invention has excellent mechanical properties, and the flexible container, water shielding sheet and resin coated-cloth ventilation tube which are prepared from the composite sheet fabricated from the fabric are excellent in folding ability, air leakage resistance, welding ability, weatherability and mechanical strengths. When these industrial materials are wasted and buried under the ground or abandoned into the river or sea, these materials can be degraded into nontoxic water and carbon dioxide within a relatively short period in natural environment similarly to matters such as paper and wood.

DETAILED DESCRIPTION OF PREFERRED EMBODIMENTS

The invention is an industrial fabric prepared from a thermoplastic polymer composition primarily comprising a lactic acid base polymer, a composite sheet fabricated from the industrial fabric, and a flexible container, water shielding sheet and resin coated-cloth ventilation tube which are prepared from the composite sheet and can be degraded in natural environment.

The thermoplastic polymer composition used in the invention comprises a lactic acid base polymer as a principal component. Usually known thermoplastic polymers such as polyethylene, polyamide polycaprolactone and starch can also be added to the composition in a range (usually 50% or less) giving no adverse effect on the degradability. When desired, plasticizers and other additives can be incorporated in order to improve processability of the composition and properties of the product.

The lactic acid base polymer used for the invention is polylactic acid or a copolymer of lactic acid and the other hydroxycarboxylic acids than lactic acid. L-lactic acid, D-lactic acid, a mixture of L-lactic acid and D-lactic acid or lactide which is a cyclic dimer of lactic acid can be used for a raw material of the present invention. Hydroxycarboxylic acids for raw materials of copolymers of the present invention include such carboxylic acids as glycolic acid, 3-hydroxybutyric acid, 4-hydroxybutyric acid, 4-hydroxyvaleric acid, 5-hydroxyvaleric acid and 6-hydroxycaproic acid or such cyclic ester intermediates of hydroxycarboxylic acids as glycolide which is a dimer of glycolic acid and $\epsilon$-caprolactone which is a dimer of 6-hydroxycarboxylic acid.

The lactic acid base polymer of the present invention can be obtained by a direct dehydrating polycondensation process of lactic acid or a mixture of lactic acid and the other hydroxycarboxylic acid than lactic acid or by a ring-opening polymerization process of a cyclic dimer such as lactide, the cyclic dimer of lactic acid, glycolide, the cyclic dimer of glycolic acid, $\epsilon$-caprolactone, the cyclic ester of 6-hydroxycaproic acid and other monomers which are copolymerizable with these raw materials.

However, the lactic acid base polymer which is suitable for the woven fabric and the composite sheet fabricated from the woven fabric of the present invention is preferably prepared by direct dehydration condensation of lactic acid or a mixture of lactic acid with other hydroxycarboxylic acid which is subjected to azeotropic dehydration condensation in the presence of an organic solvent, phenyl ether base solvent in particular. The condensation is more preferably progressed by returning a substantially anhydrous solvent to the reaction system after removing water from an azeotropically distilled solvent. High molecular weight polylactic acid having sufficient strength for use in the invention can be obtained by such a method. The polymer thus obtained, a copolymer of L-lactic acid and D-lactic acid or a copolymer of lactic acid and glycolic acid in particular, differs in physical properties from the polymer obtained by usual ring-opening polymerization. A composite material prepared from the polymer thus obtained also differs in properties for practical use such as heat sealability.

The lactic acid base polymer which can be used in the invention has a molecular weight of 10,000 or more, and a high molecular weight polymer can be used so long as the polymer can be processed. The polymer having a molecular weight of less than 10,000 leads to low mechanical strengths of the fabric and composite sheet and is unsuitable for practical use. Even the polymer having a molecular weight of 1,000,000 or more can also be applied to the preparation of the fabric and the composite sheet in the invention by designing processing methods.

The thermoplastic polymer composition can be mixed with usually known plasticizers and other additives and hot-kneaded into pellets, bars and powder.

Next, the process for preparing the industrial fabric from the thermoplastic polymer composition of the invention will be illustrated in detail.

The fabric is generally prepared by melt-spinning the composition into a filament yarn, and successively fabricating the filament yarn into the fabric with a weaving machine. No particular restriction is imposed upon the type of equipment for melt-spinning into the monofilament so long as the equipment has a melt zone including a cylinder and screw, and an extruder head including a spinning nozzle. Temperature suited for spinning depends upon the kind and molecular weight of the polymer and is in the range of 150°–300° C., preferably 170°–250° C.

Temperature less than 150° C. leads to high melt viscosity and a monofilament having good properties cannot be obtained. Temperature higher than 300° C. sometimes causes unfavorable decomposition. Common spinnerets can be used for the spinning nozzle. For example, a nozzle having a bore diameter of 0.3 mm or less is preferably used. A melt-spun fibrous matter is cooled, stretched in a hot heating medium and successively subjected to heat setting to obtain a monofilament. The monofilament thus obtained can be collected, when desired, to give a multifilament. Stretching conditions such as stretching temperature and stretch ratio are suitably selected depending upon the required properties of the desired filament. The stretching temperature is usually above the glass transition temperature and below the melting point, that is from 50° to 170° C. The stretch ratio is suitably from 4 to 15 times. Stretching is preferably carried out in multiple steps. The size of the filament is optionally selected depending upon the object of industrial materials and is preferably 0.2~0.8 mm. Fabrication of the filament into a fabric is generally carried out with a common weaving machine for synthetic fibers, for example a heavy cloth weaving machine for use in the fabrication of a canvas and curing sheet. The fabric thus obtained has high mechanical strengths and is most suited for a mesh sheet used for building field work in accordance with JIS A-8952. The fabric thus obtained can be used for an industrial material depending upon the desired application. A composite sheet is prepared from the fabric. The fabric which can be used for the composite sheet is preferably woven so as to have a void percentage of 30–80 (%) per unit area in order to prevent dislocation of the filament and to improve adhesion of the fabric and resin due to penetration of the resin into voids of the fabric in the laminating step of the fabric and resin.

The industrial fabric of the invention can be further fabricated and used in the form of a sheet. Preparation process of the composite sheet will be illustrated in detail. The composite sheet is generally prepared by laminating the fabric and said composition with a calendering machine. Other processes are an extrusion lamination process where said composition is melted in an extruder and delivered through a T-die fitted at the top of the extruder and the resulting film is continuously laminated on the underside of the above fabric, a lamination process where said composition is melt-processed into a film with the extruder and the above fabric is laminated with an adhesive, a hot-melt laminating process where a film delivered from the T-die is laminated with the fabric through hot rolls, and impregnation process where molten resin is penetrated into the fabric. Any of the above processes can be used for preparing the composite sheet of the invention. The composite sheet preferably has a thickness of 0.2~2.0 mm, more preferably 0.3~1.3 mm as an industrial material.

Next, preparation processes of the flexible container water shielding sheet and resin coated-cloth ventilation tube from the composite sheet will be illustrated.

Flexible containers are used for transporting nonhazardous powder or granules, can be folded and are bags equipped with a sling fitting for lifting and an opening for charging and discharging. The flexible container of the invention includes for example, a container in accordance with JIS Z-1651, and is useful as a one-way container which is discarded after use in principle. The container is prepared from the composite sheet. That is, the composite sheet is fabricated into a bag by high frequency electric welding on by hot air welding and equipped with a sling fitting for lifting and an opening for charging discharging the content to give a flexible container. The flexible container thus obtained can be folded and has excellent flexibility and high mechanical strengths which is durable under load of the packed material.

The water shielding sheet is a temporary sheet for use in a site of building and construction. Said composite sheet is welded into a suitable form and equipped with holes for fixing or connection to give the water shielding sheet having excellent mechanical strength and waterproofness.

The resin-treated-fabric ventilation tube is used for ventilation in a site of building, construction or mining and includes, for example, vinyl coated cloth ventilation tube specified in accordance with JIS M-7102. The resin coated-cloth ventilation tube of the invention can be prepared from said composite sheet. The composite sheet is stitched or welded into a cylindrical form, rings or a spiral of steel wire are fabricated on the inside or outside of the cylinder at a suitable internal, and the cylinder is made nestable on both ends. Further, appropriate numbers of sling fittings are mounted on the ventilation tube for the convenience of horizontally suspending or vertically draping the ventilation tube. The resin coated-cloth ventilation tube thus obtained can be folded and is excellent in air leakage resistance, mechanical strengths and other properties in practical uses.

The above flexible container, water shielding sheet and resin coated-cloth ventilation tube can be degraded under the ground though discarded after use as a waste material.

EXAMPLES

The present invention will hereinafter be illustrated in detail by way of examples and comparative examples.

Part means part by weight in these examples except that units are elucidated.

1. PREPARATION EXAMPLES OF THE POLYLACTIC ACID BASE POLYMER

PREPARATION EXAMPLE 1

In a 100 L reaction vessel equipped with a Dien-Stark trap, 10.0 kg of 90% L-lactic acid was heated with stirring for 3 hours at 150° C./50 mmHG while distilling off water. And then, 6.2 g of tin powder was added and the reaction mixture was further stirred for 2 hours at 150° C./30 mmHg to obtain an oligomer. To the oligomer, 28.8 g tin powder and 21.1 kg of diphenyl ether were added and an azeotropic dehydration reaction was carried out at 150° C./30 mmHg. Water and the solvent which were distilled out were separated in a water separator and the solvent alone was returned to the reaction vessel. After reacting for 2 hours, the returning solvent was changed to pass through a column packed with 4.6 kg of molecular sieve 3A in order to dry the solvent prior to return to the reactor, and the reaction was further carried out for 40 hours at 150° C./35 mmHg to obtain a solution of polylactic acid having an average molecular weight of 110,000.

To the solution, 44 kg of dehydrated diphenyl ether was added and cooled to 40° C. Precipitated crystals were filtered, washed 3 times with 10 kg of n-hexane and dried at 60° C./50 mmHg. To the crystals obtained, 12 kg of 0.5N hydrochloric acid and 12 kg of ethanol were added, stirred for an hour at 35° C. and filtered. Precipitated powder was filtered and dried at 60° C./50 mmHg to obtain 6.1 kg (85% yield) of polylactic acid powder. Pellets of L-lactic acid polymer was prepared by melting the powder in an extruder and the polymer had an average molecular weight of 110,000.

PREPARATION EXAMPLE 2

The same procedures as described in Preparation Example 1 were carried out except that 100 parts (to which 10.0 kg was converted) of L-lactic acid were replaced by 100 parts of DL-lactic acid. The pellets of DL-lactic acid polymer thus obtained had an average molecular weight of 110,000.

PREPARATION EXAMPLE 3

The same procedures as described in Preparation Example 1 were carried out except that 100 parts of L-lactic acid were replaced by 50 parts of L-lactic acid and 50 parts of glycolic acid as the other hydroxycarboxylic acid to obtain pellets of the copolymer of L-lactic acid and a hydroxycarboxylic acid. The pellets of the copolymer thus obtained had an average molecular weight of 110,000.

PREPARATION EXAMPLE 4

The same procedures as described in Preparation Example 1 were carried out except that 100 parts of L-lactic acid were replaced by 50 parts of L-lactic acid and 50 parts of 6-hydroxycaproic acid as the other hydroxycarboxylic acid to obtain pellets of the copolymer of L-lactic acid and a hydroxycarboxylic acid. The pellets of the copolymer thus obtained had an answer average molecular weight of 70,000.

2. PREPARATION OF INDUSTRIAL FABRICS

EXAMPLE 1-3

Thermoplastic polymer compositions were obtained by mixing poly-L-lactic acid of Preparation Example 1 with poly-DL-lactic acid of Preparation Example 2 in proportions illustrated in Table 1.

These polymer compositions were melt-spun with a common extruder in nitrogen atmosphere at 235° C. under the extrusion pressure of 130 kg/cm$^2$, successively stretched five times, subjected to heat setting at 130° C., and collected to obtain a filament of 0.24 mm in size. The filament obtained was plainly woven with a usual Rapier weaving machine to obtain a longitudinal (machine direction) fiber density of 24 counts per inch a transverse (cross direction) fiber density of 24 counts per inch. Void percentage was 60%.

EXAMPLE 4-5

An equal amount mixture of poly-L-lactic acid obtained in Preparation Example 1 and poly-DL-lactic acid obtained in Preparation Example 2 was melt-extruded by the same procedures as described in example 1. The filament obtained had a size of 0.15 mm in Example 4 and 0.34 mm in Example 5. Fabrics were prepared by the same procedures as described in Example 1 and properties of the fabrics were measured. Results are illustrated in Table 1.

EXAMPLE 6

A thermoplastic polymer composition was prepared by mixing 95 parts of poly-L-lactic acid obtained in Preparation Example 1 with 5 parts by weight of glycerol triacetate plasticizer. A fabric was prepared from the composition by the same procedures as described in Example 1. The fabric had longitudinal and transverse tensile strengths of 70 and 65 kgf/3 cm, respectively, and longitudinal and transverse elongations at break of 30 and 32%, respectively. After the test of degradation in soil, fabric had weight loss of 19% and was collapsed by small external force.

COMPARATIVE EXAMPLE 1

A fabric was prepared by carrying out the same procedures as described in Example 1 except that poly-L-lactic acid and poly-DL-lactic acid were replaced by polyethylene terephthalate.

Properties of the fabrics obtained in the examples and comparative example were measured by the following methods.

(1) Tensile strength and elongation at break (Strip method):

Rectangular specimens were cut out of the fabrics and measured at a camp moving speed of 200 mm/min in accordance with JIS L-1096.

(2) Degradation in soil:

Fabric specimens having dimensions of 5 cm × 5 cm were buried in soil at 35° C. under moisture content of 30%. Results were evaluated by appearance change and weight loss.

Results are illustrated in Table 1. Sample of Comparative Example 1 had poor degradability in soil.

EXAMPLE 7-8

Fabrics were prepared by carrying out the same procedures as described in Example 1 except that copolymers of lactic acid and a hydroxycarboxylic acid which were obtained in Preparation Example 3-4 were used. Properties of these fabrics were measured and results are illustrated in Table 2.

EXAMPLE 9

A fabric was prepared by carrying out the same procedures as described in Example 1 except that poly-L-lactic acid of preparation Example 1 and polyamide (nylon-6) were used in a proportion of 70/30. Properties of the fabric were measured and results are illustrated in Table 2.

TABLE 1

|  | Example | | | | | Comparative Example |
|---|---|---|---|---|---|---|
|  | 1 | 2 | 3 | 4 | 5 | 1 |
| Polymer composition | | | | | | |
| L-lactic acid (wt %) | 80 | 50 | 20 | 50 | 50 | Polyethylene terephthalate |
| DL-Lactic acid (wt %) | 20 | 50 | 80 | 50 | 50 | |
| Fabric specification | | | | | | |
| Filament size (mm) | 0.24 | 0.24 | 0.24 | 0.15 | 0.34 | 0.24 |
| Void percentage (%) | 60 | 60 | 60 | 72 | 60 | 60 |
| Property | | | | | | |
| Tensile strength (kgf/3 cm) *1 | | | | | | |
| MD | 78 | 75 | 74 | 49 | 119 | 75 |
| CD | 72 | 70 | 67 | 44 | 115 | 25 |
| Elongation (%) | | | | | | |
| MD | 20 | 21 | 25 | 23 | 25 | 22 |
| CD | 23 | 23 | 27 | 25 | 27 | 25 |
| Degradation in soil (2 months) | | | | | | |
| Appearance | collapsed by weak force | | | | | no change |
| Weight loss (%) | 18 | 22 | 23 | 25 | 20 | 0 |

Note:
*1 MD: machine (longitudinal) direction
CD: cross (transverse) direction

TABLE 2

|  | Example | | |
|---|---|---|---|
|  | 7 | 8 | 9 |
| Polymer composition | | | |
| L-lactic acid (wt %) | 50 | 50 | Poly-L-lactic acid 70 |
| Hydroxy carboxylic acid (wt %) | Glycolic acid 50 | 6-Hydroxycaproic acid 50 | Nylon-6 30 |
| Fabric specification | | | |
| Filament size (mm) | 0.24 | 0.24 | 0.24 |
| Void percentage (%) | 60 | 60 | 60 |
| Property | | | |
| Tensile strength (kgf/3 cm) *1 | | | |
| MD | 68 | 58 | 65 |
| CD | 61 | 52 | 60 |
| Elongation (%) | | | |
| MD | 20 | 17 | 26 |
| CD | 30 | 35 | 28 |
| Degradation in soil (2 months) | | | |
| Appearance | collapsed by weak force | | |
| Weight loss (%) | 42 | 35 | 15 |

Note:
*1 MD: machine direction
CD: cross direction

3. PREPARATION OF FLEXIBLE CONTAINERS

EXAMPLE 10-12

Poly-L-lactic acid obtained in Preparation Example 1 and poly-DL-lactic acid obtained in Preparation Example 2 were mixed in proportions illustrated in Table 3. The mixture thus obtained was melt-spun to obtain a filament having a size of 0.34 mm. The filament thus obtained was plainly woven to give a fabric. The resulting fabric had a longitudinal fiber density of 17 counts per inch, transverse fiber density of 17 counts per inch, and weight per unit area, i.e., METSUKE of 150 g/m².

Separately, the above polymer was melt-kneaded with an extruder and delivered through a T-die into a film having thickness of 0.38 mm. The above fabric was continuously superimposed on the extruded film and hot-welded by compressing with a pair of rolls while the film was still hot and in a semi-molten state. The extruded film was further laminated on another surface of the fabric to obtain a composite sheet having the extruded films integrated on both sides of the fabric.

The composite sheet has a thickness of 1 mm. The composite sheet was welded into a bag having an internal diameter of 800 mm and height of 700 mm to obtain a flexible container having an opening on the top.

COMPARATIVE EXAMPLE 2

A flexible container was prepared by the same procedures as described in Example 10 except that poly-L-lactic acid and poly-DL-lactic acid were replaced by a filament of polyethylene terephthalate and an extruded sheet of polyvinyl chloride.

Properties of the flexible containers obtained in the examples and comparative example were measured by the following methods.

(1) Physical properties:

Weatherability, heat resistance, cold resistance, flex resistance, lifting strength, stacking strength, drop strength and tear propagation strength were measured in accordance with JIS Z-1651.

(2) Degradation in soil:

A specimen having dimensions of 5 cm×5 cm was cut out of a flexible container and buried in soil at 35° C. under moisture content of 30%. After, the test, appearance change and weight loss of the sample evaluated.

Results are illustrated in Table 3. Sample of Comparative Example 2 had poor degradability in soil.

EXAMPLE 13-14

Flexible containers were prepared by the same procedures as described in Example 10 except that copolymers of lactic acid and a hydroxycarboxylic acid which are obtained in Preparation Examples 3-4 were used. The properties of these containers were measured and results are illustrated in Table 3.

obtained was plainly woven to give a fabric. The resulting fabric had a longitudinal fiber density of 25 counts per inch, transverse fiber density of 25 counts per inch, and weight per unit area, i.e., METSUKE of 50 g/m².

Separately, the above polymer was melt-kneaded with an extruder and processed through a T-die into a film having a desired thickness of 0.17 mm. The above fabric was continuously superimposed on the extruded film and hot-welded by compressing with a pair of rolls while the film was still hot and in a semi-molten state. The extruded film was further laminated on another surface of the fabric to obtain a composite sheet having the extruded films integrated on the both sides of the fabric. The composite sheet had thickness of 0.36 mm.

COMPARATIVE EXAMPLE 3

A water shielding sheet was prepared by the same procedures as described in Example 15 except that poly-L-lactic acid and poly-DL-lactic acid were replaced by a filament of polyethylene terephthalate and an extruded sheet of polyvinyl chloride.

Properties of the water shielding sheet obtained in the examples and comparative example were measured by the following methods.

(1) Tensile strength and elongation at break (strip method):

Rectangular specimens were cut out of the water shielding sheet in the longitudinal and transverse directions. Measurement was carried out at a clamp moving speed of 200 mm/min in accordance with JIS L-1096.

(2) Tear strength (Trapezoid method):

Specimens were the same as used in the tensile strength test. Measurement was carried out at a clamp moving speed of 200/min in accordance with JIS L-

TABLE 3

| | Example 10 | Example 11 | Example 12 | Example 13 | Example 14 | Comparative Example 2 |
|---|---|---|---|---|---|---|
| Polymer composition | | | | Copolymer composition | | Fablic |
| Poly-L-lactic acid (wt %) | 80 | 50 | 20 | L-lactic acid 50 | L-lactic acid 50 | Polyethylene terephthalate |
| Poly-DL-lactic acid (wt %) | 20 | 50 | 80 | Glycolic acid 50 | 6-Hydroxycaproic acid 50 | Sheet Polyvinyl chloride |
| Weatherability | | | | | | |
| Appearance | good | good | good | good | good | good |
| Tensile strength (kgf/3 cm) | 160 | 140 | 136 | 135 | 130 | 13 |
| Tear strength (kgf) | 32 | 32 | 31 | 28 | 28 | 3 |
| Heat resistance | no development of surface tack, crack, damage, or surface release | | | | | |
| Cold resistance | no development of surface damage or craze | | | | | |
| Flex resistance | no development of surface crack damage or surface release after 200 flexes | | | | | |
| Lifting resistance | no development of content leakage or damage after 30 lifting | | | | | |
| Stack resistance | no development of content leakage under load equivalent to 4 stacks | | | | | |
| Drop resistance | no development of content leakage or damage by dropping 0.8 m | | | | | |
| Tear propagation Notch length (mm) | 48 | 41 | 42 | 47 | 50 | 4 |
| Degradation in soil (2 months) | | | | | | |
| Appearance | | collapsed by weak external force | | | | no change |
| Weight loss (%) | 12 | 13 | 15 | 27 | 22 | 0 |

4. PREPARATION OF WATER SHIELDING SHEETS

Example 15-17

Poly-L-lactic acid obtained in Preparation Example 1 and poly-DL-lactic acid obtained in Preparation Example 2 were mixed in proportions illustrated in Table 4. The mixture thus obtained was melt-spun to obtain a filament having a size of 0.16 mm. The filament thus

1096.

(3) Flex-rigidity (Gurley method):

Specimens were same as used in the tensile strength test. Measurement was carried out by using a Gurley stiffness tester in accordance with JIS L-1096.

(4) Waterproofness:

Water pressure of 3 kg/cm² was applied for 3 minutes to the water shielding sheets obtained in the examples and comparative example and successively water leakage was inspected.

(5) Degradation in soil:

Specimens having dimensions of 5 cm×5 cm were cut out of the water shielding sheets and buried in soil at 35° C. and under moisture content of 30%. After the test, appearance change and weight loss of the specimens were evaluated.

Results are illustrated in Table 4. Comparative Example 3 had poor degradability in soil.

EXAMPLE 18-19

Water shielding sheets were prepared by the same procedures as described in Example 15 except that copolymers of lactic acid and a hydroxycarboxylic acid which were obtained in Preparation Examples 3-4 were used. The properties of these sheets were measured and results are illustrated in Table 4.

A resin coated-cloth ventilation tube of 3 m in length was prepared by molding the composite sheet into a cylinder of 200 mm in internal diameter, fabricating a steel wire spiral on the outside of the cylinder, and making the cylinder nestable on both ends.

Comparative Example 4

A resin coated-cloth ventilation tube was prepared by the same procedures as described in Example 20 except that poly-L-lactic acid and poly-DL-lactic acid were replaced by a filament of polyethylene terephthalate and an extruded sheet of polyvinyl chloride.

Properties of the resin coated-cloth ventilation tubes obtained in the examples and comparative example were measured by the following methods.

(1) Tensile strength and elongation at break (strip method):

Rectangular specimens were cut out of the resin coat-

TABLE 4

|  | Example 15 | Example 16 | Example 17 | Example 18 | Example 19 | Comparative Example 3 |
|---|---|---|---|---|---|---|
| Polymer composition |  |  | Copolymer composition |  |  | Fablic |
| Poly-L-lactic acid (wt %) | 80 | 50 | 20 | L-lactic acid 50 | L-lactic acid 50 | Polyethylene terephthalate |
| Poly-DL-Lactic acid (wt %) | 20 | 50 | 80 | Glycolic acid 50 | 6-Hydroxycaproic acid 50 | Sheet Polyvinyl chloride |
| Tensile strength (kgf/3 cm) |  |  |  |  |  |  |
| MD*1 | 60 | 58 | 54 | 53 | 46 | 56 |
| CD | 55 | 52 | 49 | 48 | 40 | 50 |
| Elongation (%) |  |  |  |  |  |  |
| MD | 26 | 27 | 30 | 32 | 30 | 35 |
| CD | 28 | 27 | 35 | 35 | 35 | 37 |
| Tear resistance |  |  |  |  |  |  |
| MD | 10 | 10 | 9 | 10 | 8 |  |
| CD | 11 | 10 | 9 | 9 | 7 | 10 |
| Flex rigidity (g) | 0.45 | 0.41 | 0.38 | 0.44 | 0.38 | 0.41 |
| Waterproofness | no development of water leakage or crack |  |  |  |  |  |
| Degradation in soil (2 months) |  |  |  |  |  |  |
| Appearance | collapsed by weak external force |  |  |  |  | no change |
| Weight loss (%) | 16 | 17 | 21 | 27 | 25 | 0 |

Note:
*1MD: machine direction
CD: cross direction

5. PREPARATION OF RESIN COATED-CLOTH VENTILATION TUBES

Example 20-22

Poly-L-lactic acid obtained in Preparation Example 1 and poly-DL-lactic acid obtained in Preparation Example 2 were mixed in proportion illustrated in Table 5. The mixture thus obtained was melt-spun to obtain a filament having a size of 0.24 mm. The filament thus obtained was plainly woven to give a fabric. The resulting fabric had a longitudinal fiber density of 24 counts per inch, transverse fiber density of 24 counts per inch, and weight per unit area, i.e., METSUKE of 100 g/m².

Separately, the above polymer was melt-kneaded with an extruder and processed through a T-die a film having a desired thickness of 0.25 mm. The above fabric was continuously superimposed on the extruded film and hot-welded by compressing with a pair of rolls while the film was still hot and in a semi-molten state. The extruded film was further laminated on another surface of the fabric to obtain a composite sheet having the extruded films integrated on both sides of the fabric. The composite sheet has a thickness of 0.55 mm.

ed-cloth ventilation tubes in the longitudinal and transverse directions. Tensile strength was measured at a clamp moving speed of 200 mm/min in accordance with JIS M-7102.

(2) Tear strength (single long method):

Rectangular specimens were cut out the resin coated-cloth ventilation tube and matched with an internal length of 75 mm parallel to the long side at the center of the short side. Tear strength of the matched specimen was measured at a clamp moving speed of 200 mm/min in accordance with JIS M-7102.

(3) Heat resistance:

Abnormal appearance was inspected after allowing the specimen to stand for an hour under 1 kgf load at 80° C. in a constant temperature oven in accordance with JIS M-7102.

(4) Cold resistance:

Abnormal appearance was inspected after allowing the specimen to stand for 2 hours at −25° C. in a constant temperature oven in accordance with JIS M-7102.

(5) Flex resistance:

Abnormal appearance was inspected after flexing 1000 times under 1 kgf load in accordance with JIS M-7102.

(6) Weld strength:

Measurement was carried out at a clamp moving speed of 300 mm/min in accordance with JIS M-7102.

(7) Degradation in soil:

Specimens having dimensions of 5 cm×5 cm were cut out of the water shielding sheets and buried in soil at 35° C. and under moisture content of 30%. After the test, appearance change and weight loss of the specimens were evaluated.

Results are illustrated in Table 5. Comparative Example 4 had poor degradability in soil.

Example 23-24

Resin coated-cloth ventilation tubes were prepared by the same procedures as described in Example 20 except that copolymers of lactic acid and hydroxycarboxylic acid which were obtained in Preparation Examples 3-4 were used. The properties of these tubes were measured and results are illustrated in Table 5.

TABLE 5

| | Example 20 | Example 21 | Example 22 | Example 23 | Example 24 | Comparative Example 4 |
|---|---|---|---|---|---|---|
| Polymer composition | | | | Copolymer composition | | Fablic |
| Poly-L-lactic acid (wt %) | 80 | 50 | 20 | L-lactic acid 50 | L-lactic acid 50 | Polyethylene terephthalate |
| Poly-DL-Lactic acid (wt %) | 20 | 50 | 80 | Glycolic acid 50 | 6-Hydroxycaproic acid 50 | Sheet Polyvinyl chloride |
| Tensile strength (kgf/3 cm) | | | | | | |
| MD*[1] | 92 | 88 | 87 | 80 | 68 | 90 |
| CD | 85 | 82 | 79 | 72 | 61 | 80 |
| Elongation (%) | | | | | | |
| MD | 24 | 25 | 29 | 24 | 20 | 25 |
| CD | 27 | 27 | 32 | 23 | 19 | 30 |
| Tear strength (kgf) | | | | | | |
| MD | 15 | 15 | 13 | 13 | 14 | 20 |
| CD | 14 | 15 | 14 | 12 | 13 | 20 |
| Heat resistance | | | no development of tack or crack | | | |
| Cold resistance | | | no development of damage craze or crack | | | |
| Flex resistance | | | no development of crack or damage | | | |
| Weld strength (kgf/3 cm) | | | | | | |
| MD | 67 | 63 | 62 | 68 | 55 | 65 |
| CD | 63 | 60 | 59 | 57 | 50 | 61 |
| Degradation in soil (2 months) | | | | | | |
| Appearance | | | collapsed by weak external force | | | no change |
| Weight loss (%) | 15 | 16 | 19 | 29 | 24 | 0 |

Note:
*[1]MD: machine direction
CD: cross direction

However, these examples are not intended to limit the scope of the present invention. This may be practiced or embodied in still other ways without departing from the spirit or essential character thereof.

We claim:

1. An industrial fabric prepared from a thermoplastic polymer composition primarily comprising polylactic acid or a copolymer of lactic acids and other hydroxycarboxylic acids than lactic acids.

2. An industrial fabric of claim 1 wherein the lactic acids are selected from lactic acid and lactide.

3. An industrial fabric of claim 2 wherein lactic acid is L-lactic acid, D-lactic acid or a mixture thereof.

4. An industrial fabric of claim 2 wherein the other hydroxycarboxylic acids are selected from glycolic acid and 6-hydroxycaproic acid.

5. A composite sheet obtained by the process comprising laminating a film prepared from a thermoplastic polymer composition primarily comprising polylactic acid or a copolymer of lactic acids and other hydroxycarboxylic acids than lactic acids on one or both sides of the industrial fabric of claim 1, or impregnating the industrial fabric of claim 1 with the thermoplastic polymer composition.

6. A degradable flexible container prepared from the composite sheet of claim 5.

7. A degradable water shielding sheet prepared from the composite sheet of claim 5.

8. A degradable resin coated-cloth ventilation tube prepared from the composite sheet of claim 5.

* * * * *

UNITED STATES PATENT AND TRADEMARK OFFICE
CERTIFICATE OF CORRECTION

PATENT NO. : 5,294,469

DATED : March 15, 1994

INVENTOR(S) : SUZUKI et al.

It is certified that error appears in the above-identified patent and that said Letters Patent is hereby corrected as shown below:

On the face of the patent, after "Inventors:" change "Kazuhika" to --Kazuhiko--.

Signed and Sealed this

Twenty-seventh Day of September, 1994

Attest:

BRUCE LEHMAN

Attesting Officer

Commissioner of Patents and Trademarks